United States Patent
Grimm

(10) Patent No.: US 8,217,791 B2
(45) Date of Patent: *Jul. 10, 2012

(54) TRACKING UNIT

(75) Inventor: Phillip H. Grimm, Scottsdale, AZ (US)

(73) Assignee: 3SI Security Systems, Inc., Macon, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/039,059

(22) Filed: Mar. 2, 2011

(65) Prior Publication Data

US 2011/0148627 A1 Jun. 23, 2011

Related U.S. Application Data

(63) Continuation of application No. 10/920,598, filed on Aug. 16, 2004, now Pat. No. 7,902,980, which is a continuation of application No. 09/968,289, filed on Oct. 1, 2001, now Pat. No. 6,801,129.

(51) Int. Cl.
  *G08B 13/14* (2006.01)
(52) U.S. Cl. ............ 340/568.7; 340/539.13; 340/825.49
(58) Field of Classification Search ............... 340/568.7, 340/539.13, 825.49
  See application file for complete search history.

(56) References Cited

U.S. PATENT DOCUMENTS

| | | | |
|---|---|---|---|
| 3,564,525 A | 2/1971 | Robeson at al. | |
| 3,618,059 A | 11/1971 | Allen | |
| 3,828,341 A | 8/1974 | Carter, Jr. et al. | |
| 4,021,807 A | 5/1977 | Culpepper et al. | |
| 4,511,888 A | 4/1985 | Bernhardt | |
| 4,559,529 A | 12/1985 | Bernhardt | |
| 4,855,713 A | 8/1989 | Brunius | |
| 4,975,680 A | 12/1990 | Fogle, Jr. | |
| 5,059,949 A | 10/1991 | Caparoni et al. | |
| 5,091,713 A | 2/1992 | Horne et al. | |
| 5,196,828 A | 3/1993 | Keniston | |
| 5,223,844 A | 6/1993 | Mansell et al. | |
| 5,266,958 A | 11/1993 | Durboraw, III | |
| 5,367,148 A | 11/1994 | Storch et al. | |

(Continued)

FOREIGN PATENT DOCUMENTS

DE 3400526 A1 10/1985

(Continued)

OTHER PUBLICATIONS

Seiko Instruments, Inc., "S-801 Series, High-Precision Voltage Supervisor with a Built-in Delay," 42 pgs.

*Primary Examiner* — Brent Swarthout
(74) *Attorney, Agent, or Firm* — RatnerPrestia

(57) ABSTRACT

A tracking unit for assisting in the recovery of stolen monies or other property includes a housing containing a GPS receiver for receiving GPS signals from overhead satellites, a cellular phone transceiver, a microprocessor, and a battery. Following a theft, the microprocessor activates the cellular phone transceiver to dial the telephone number of a central monitoring station. The microprocessor obtains location data from the GPS receiver and transmits the location data, along with identification information, to the central monitoring station. The tracking unit also includes a separate, conventional RF beacon transmitter for allowing authorities to home-in on the tracking unit within a large building or other structure, either after the GPS signals are lost, or after the location of the tracking unit is localized to a specific building or area.

19 Claims, 3 Drawing Sheets

U.S. PATENT DOCUMENTS

| | | |
|---|---|---|
| 5,392,052 A | 2/1995 | Eberwine |
| 5,448,223 A | 9/1995 | Johnson |
| 5,485,143 A | 1/1996 | Keniston |
| 5,515,032 A | 5/1996 | Johnson |
| 5,554,993 A | 9/1996 | Brickell |
| 5,557,254 A | 9/1996 | Johnson et al. |
| 5,594,425 A * | 1/1997 | Ladner et al. ............ 340/539.18 |
| 5,682,133 A | 10/1997 | Johnson et al. |
| 5,748,084 A | 5/1998 | Isikoff |
| 5,838,237 A | 11/1998 | Revell et al. |
| 5,952,920 A | 9/1999 | Braddick |
| 6,025,777 A | 2/2000 | Fuller et al. |
| 6,072,396 A * | 6/2000 | Gaukel ...................... 340/573.4 |
| 6,121,922 A | 9/2000 | Mohan |
| 6,246,337 B1 | 6/2001 | Rosenberg et al. |
| 6,249,217 B1 | 6/2001 | Forbes |
| 6,249,245 B1 | 6/2001 | Watters et al. |
| 6,353,390 B1 | 3/2002 | Beri et al. |
| 6,362,736 B1 | 3/2002 | Gehlot |
| 6,552,660 B1 | 4/2003 | Lisowski |
| 6,801,129 B2 * | 10/2004 | Grimm ...................... 340/568.7 |
| 7,171,187 B2 | 1/2007 | Haave et al. |
| 7,902,980 B2 * | 3/2011 | Grimm ...................... 340/568.7 |
| 2001/0040506 A1 | 11/2001 | Boulay et al. |
| 2002/0070874 A1 | 6/2002 | Williams et al. |

FOREIGN PATENT DOCUMENTS

| | | |
|---|---|---|
| DE | 3530473 A1 | 3/1987 |
| DE | 296 14 823 U1 | 10/1996 |
| DE | 297 02 771 U1 | 4/1997 |
| DE | 299 19 554 U1 | 3/2000 |
| DE | 199 20 128 A1 | 12/2000 |
| EP | 1098205 A3 | 5/2001 |
| FR | 2822277 A1 | 9/2002 |

* cited by examiner

TRACKING UNIT

RELATED APPLICATION

This application is a continuation of U.S. patent application Ser. No. 10/920,598, filed Aug. 16, 2004, now U.S. Pat. No. 7,902,980, which is a continuation of application Ser. No. 09/968,289, filed Oct. 1, 2001, now U.S. Pat. No. 6,801,129, which are all hereby incorporated by reference in their entirety.

BACKGROUND OF THE INVENTION

1. Field of the Invention

The present invention relates generally to tracking systems for tracking the location of stolen articles, and more particularly, to a tracking unit for aiding law enforcement officials in apprehending thieves and recovering stolen monies or other property.

2. Description of the Relevant Art

Security packs, or "dye packs," are known in the banking and security field for assisting law enforcement officers in apprehending bank robbers and recovering stolen currency. These security packs are often disguised as bundles of currency and are handed out by bank tellers to bank robbers in the course of a robbery along with genuine, indistinguishable banded bundles of currency. The disguised security packs, though having the appearance of a banded bundle of currency bills, actually contain electronics used to trigger various compounds that can aid in apprehending the bank robber, including tear gas, smoke, and a dye that stains the robber and any other currency taken during the robbery. Various United States patents describe such security packs, including U.S. Pat. No. 4,511,888 to Bernhardt; U.S. Pat. No. 4,559,529 to Bernhardt; U.S. Pat. No. 5,196,828 to Keniston; and U.S. Pat. No. 5,485,143 to Keniston. While each of these dye pack systems includes features that enhance the effectiveness of such security packs, these known systems do not permit law enforcement authorities to track movements of a bank robber once the robber is out of visual sight.

A currency security pack has been sold in the past under the trademark "ProNet" which emits a radio frequency signal for tracking purposes. However, the "ProNet" system requires that law enforcement officers use several radio receivers to triangulate on the emitted radio signal in order to determine the location of the security pack. While such a system can be helpful if the general location of the suspect is already known, law enforcement authorities often receive insufficient warning of the robbery to permit such tracking systems to be put into operation quickly enough to locate the robber.

U.S. Pat. No. 5,223,844 to Mansell, et al., assigned to Auto-Trac, Inc. of Dallas, Tex., discloses a vehicle tracking and security system for use in the event of a vehicle theft, vehicle breakdown, or other emergency. Mobile units installed in the vehicle include a GPS signal receiver for receiving location data, as well as a cellular telephone transmitter for transmitting location information onto a cellular telephone communications link.

U.S. Pat. No. 5,392,052 to Eberwine discloses a system to assist aircraft search and rescue workers to locate missing aircraft in the event of an emergency. The device includes both a GPS receiver and a radio modem transmitter. In the event of an emergency, the device transmits current time, craft ID, and position data in a data packet.

Applicant is also aware of a security system marketed under the brand name "LowJack" that is installed in automobiles, and which transmits some form of radio and/or telephone signal to help locate a stolen automobile; Applicant believes that U.S. Pat. Nos. 5,557,254 and 5,682,133, both issued to Johnson, et al., and both assigned to Mobile Security Communications, Inc. of Norcross, Ga., disclose the aforementioned tracking system used in the "LowJack" vehicle locating system.

All of the devices described above are fairly large in size, and are typically configured to transmit the location of a vehicle to a remote location. U.S. Pat. No. 5,266,958 to Durboraw, and assigned to Motorola, Inc. of Schaumburg, Ill., discloses a somewhat smaller hand-held compass device that uses GPS signals to derive current heading information, but it does not appear that this device transmits any data to a remote location.

U.S. Pat. No. 6,121,922 to Mohan, and assigned to Veridian ERIM International, Inc. of Ann Arbor, Mich., purports to disclose a tracking system that includes a miniaturized module that can be hidden in small spaces, such as on the user's person, and which can transmit location data to a remote monitoring location. The disclosed unit is described as including a global positioning satellite receiver and related antenna, a communications transceiver, a controller, and a rechargeable battery, all mounted on a thin substrate. The Mohan patent specification states that the disclosed device is small enough to permit "implantation and covert operation in articles that are to be tracked (e.g., drugs, currency, artworks, etc.)." However, Mohan does not disclose the concealment of such a device within a disguised bundle of currency, nor does Mohan explain how such a device could actually be incorporated within a disguised bundle of currency.

In addition, the aforementioned patent to Mohan notes that a loss of signal can occur due to structural or natural interference, as might be due to buildings or terrain, for example. This loss of signal can occur because the GPS navigational signals can no longer be received by the mobile module, and/or because the mobile module is unable to effectively transmit over the communications link to the remote monitoring location.

Accordingly, it is an object of the present invention to provide a tracking unit which may be disguised as banded stack of currency bills that is capable of communicating its location to a remote monitoring station following a bank robbery.

It is another object of the present invention to provide such a tracking unit that derives location coordinates from GPS navigational signals transmitted from overhead satellites.

Still another object of the present invention is to provide such a tracking unit that can transmit such location coordinates to a remote location using conventional cellular telephone communication links.

A further object of the present invention is to provide such a tracking unit that can be tracked locally, as within a building, once such tracking unit is no longer able to detect and/or transmit location data over a conventional cellular telephone communications link.

A further object of the present invention is to provide a compact tracking unit that can be used to track the location of stolen property.

These and other objects of the present invention will become more apparent to those skilled in the art as the description thereof proceeds.

SUMMARY OF THE INVENTION

Briefly described, and in accordance with one embodiment thereof, the present invention relates to a tracking unit that may be disguised as a bundle of currency bills for assisting in the recovery of stolen monies, and including a housing simulating the size and weight of a bundled package of currency bills containing a miniaturized GPS receiver, a miniaturized communications link transmitter, a controller electrically coupled with the GPS receiver and the communications link transmitter, and a battery for selectively providing electrical power to the aforementioned components. The GPS receiver receives GPS signals from overhead satellites and creates location data corresponding to the current location of the security pack. The communications link transmitter, which is preferably a cellular telephone transmitter, establishes a communications link with a remote location, such as a central monitoring station. The controller, which may be a microprocessor, selectively causes the communications link transmitter to communicate with the remote location, and to transmit thereto the location data created by the GPS receiver for indicating the current location of the tracking unit.

Preferably, the tracking unit further includes a radio frequency transmitter disposed within the housing for selectively transmitting a radio frequency beacon, or homing, signal, different from the radio signal transmitted by the communications link transmitter. The radio frequency beacon signal allows for localized conventional radio receivers to detect such beacon signal if the GPS signals are lost, or if the general location of the tracking unit has been narrowed down to a particular building, for example. In such instances, the controller can deactivate the communications link transmitter, and activate the beacon transmitter.

In order to distinguish one such tracking unit from another, each such tracking unit is assigned a unique identification code, and the controller causes the communications link transmitter to transmit the identification code in addition to the aforementioned location data.

To prevent unnecessary battery drain, the tracking unit includes a power switch for uncoupling the battery until the tracking unit is handed to a robber or otherwise deployed. Such a power switch might, for example, take the form of a reed switch responsive to a magnetic field of a keeper plate within a bank teller drawer. In this case, the magnetic field of the keeper plate keeps the reed switch open. If desired, the tracking unit can also incorporate a battery sensor and an audible generator; the battery sensor causes the audible generator to emit warning sounds if the battery has insufficient power remaining to successfully operate the other electrical components of the tracking unit.

While the communications link transmitter can remain on continuously once triggered, it is also possible for the controller to establish a communications link with the remote location on a periodic basis after such security pack is handed to a robber, or otherwise deployed, for transmitting updated location data at periodic intervals.

Ideally, the communications link between the tracking unit and the remote location can be a two-way link, in which case the tracking unit includes a communications link receiver for receiving signals transmitted from the remote location over the communications link. In this instance, the controller is responsive to signals received by the communications link receiver from the remote location for modifying the operation of the tracking unit. For example, in response to signals received by the communications link receiver from the remote location, the controller can deactivate the communications link transmitter, and activate the radio frequency beacon transmitter.

While such tracking system may be used to track stolen monies, it may also be used to track other types of property.

DETAILED DESCRIPTION OF THE PREFERRED EMBODIMENTS

Figure 1:
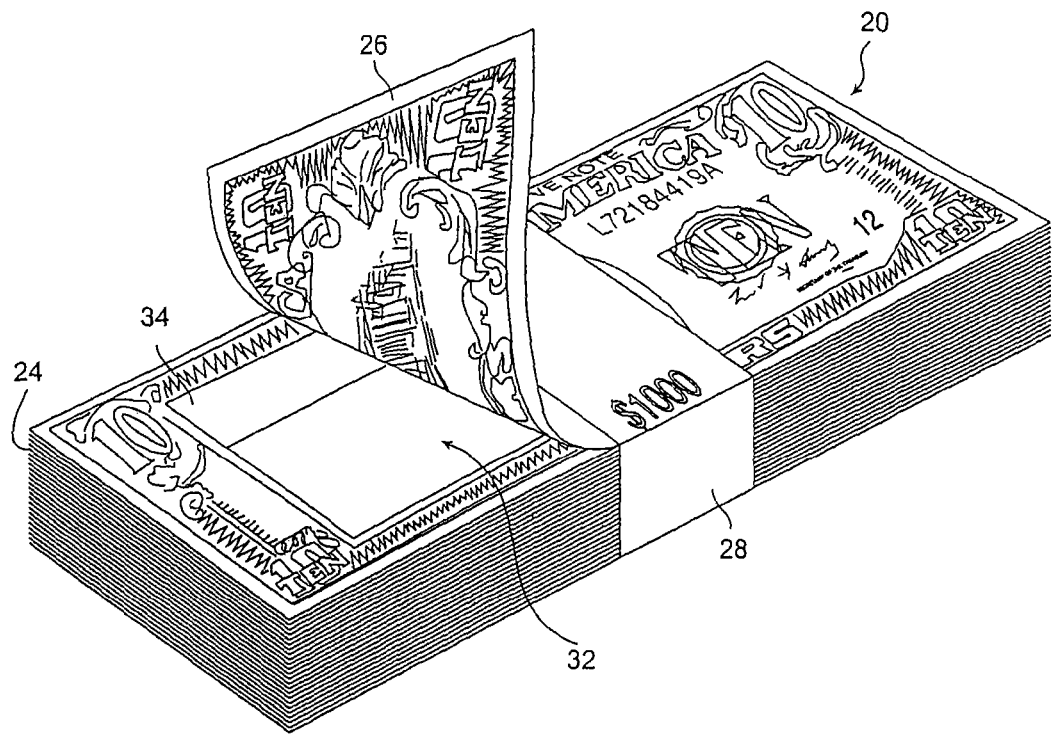
FIG. 1 is a perspective view of a security pack disguised as a banded bundle of currency bills.

As shown in FIG. 1, security pack 20 includes a housing 24 having a hollowed center portion 32 for concealing electronic components therein. Housing 24 is preferably made from actual currency bills that have been taken out of circulation, in order to give housing 24 a more realistic feel and appearance. An actual currency bill 26 is secured over the upper face of security pack 20 by band 28; similarly, another actual currency bill (not visible) covers the lower face of security pack 20. Preferably, a foam pad 34 is placed over the electrical components housed within hollowed center 32. Security pack 20 is thus disguised as a bundle of currency bills for assisting in the recovery of stolen monies. Housing 24 simulates the size and weight of an actual bundled package of currency bills Referring now to the block diagram of FIG. 2, security pack 20 includes a GPS receiver 40 and a related GPS receiver antenna 42 coupled thereto. GPS receiver receives GPS signals from overhead satellites and creates location data corresponding to the current location of the security pack. The miniaturized GPS receiver 40 and related antenna 42 may be of the type commercially available from Cadence Design Systems, Inc., as manufactured by a company named Sirf. Security pack 20 also includes a communications link transmitter which, in the preferred embodiment of the present invention, is part of a cellular telephone transceiver 44 which includes a related cellular phone antenna 45. The miniaturized cellular telephone transceiver 44 and antenna 45 are commercially available from Sprint, and are manufactured by QualComm.

Figure 2:
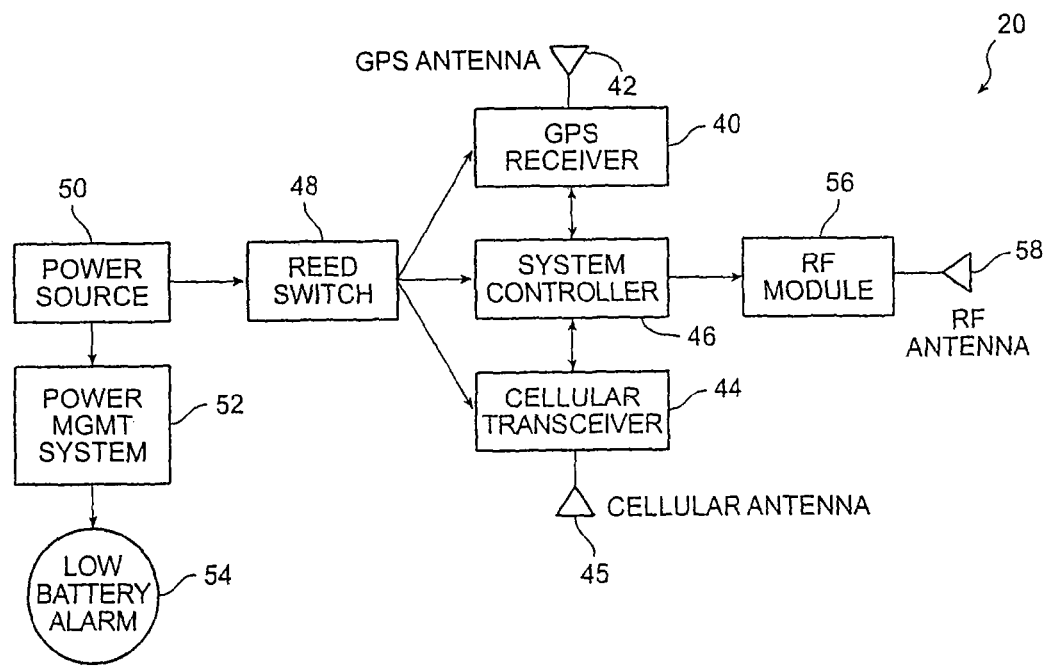
FIG. 2 is a block diagram of the electrical components of a security pack constructed in accordance with a preferred embodiment of the present invention.

Still referring to FIG. 2, GPS receiver 40 and cellular phone transceiver 44 are both coupled to system controller 46; in the preferred embodiment, controller 46 is a miniaturized central processing unit of the type commercially available from Cadence Design Systems, Inc. Controller 46 is used to interface GPS receiver 40 with cellular transmission chip set in order to dial a remotely-located, central monitoring/tracking station and to coordinate the transmission of GPS coordinate data continuously updated by GPS receiver 40.

Electrical power is selectively supplied by battery 50 to GPS receiver 40, system controller 46, and cellular phone transceiver 44, through a power switch 48; in the preferred embodiment, power switch 48 is a magnetic reed switch. Security pack 20 is normally kept on a magnetic keeper plate (not shown) in a bank teller's drawer. When reed switch 48 is in the presence of the magnetic field of the keeper plate, reed switch 48 is open, and battery 50 is disconnected from components 40, 46 and 44. However, when security pack 20 is removed from the teller drawer, and the magnetic field of the keeper plate, reed switch 48 closes, and supplies electrical power to components 40, 46, and 44. Battery 50 is preferably formed of commercially available lithium batteries which are generally lightweight, but which can store a considerable amount of electrical power.

If desired, battery 50 can be coupled electrically to a voltage sensing circuit 52, or power management circuit, to monitor the voltage remaining on battery 50. Sensing circuit 52 is coupled to a low battery alarm circuit 54 for creating an audible alarm when battery 50 no longer has sufficient electrical power to operate the remaining electrical components of security pack 20.

In the event of a bank robbery, reed switch 48 closes, and energizes controller 46, GPS receiver 40, and cellular transceiver 44. It takes GPS receiver 40 about one minute to initialize before it can provide location coordinates. Once GPS receiver 40 initializes, controller 46 directs cellular phone transceiver 44 to dial out on a cellular wireless link. This call might be received by a modem attached to a computer within a local police station or other central monitoring/tracking station (not shown). While the tracking station may be located in the general area where the bank or other protected premises is located, the cellular transceiver could, in some instances, be instructed to make a long distance call to a tracking station located in another state. Computer software installed at the monitoring station receives the GPS coordinate data received from security pack 20, and begins to map the current location of the unit on a computer display screen.

As the location coordinates change, the display screen shows a trail on the map extending from the initial location to the current location. The central monitoring station can then relay such information to a police station or directly to a vehicle-based display unit within a police car to aid in pursuit of the robber.

Controller 46 can be programmed either to "stay on the line" to continuously transmit location data to the remote tracking station, or to dial such telephone number periodically, for example, every five minutes, in order to transmit the then-current location of the security pack to the central tracking station. Such information can then be used by local police authorities to help apprehend the bank robber, and to recover the stolen money. Preferably, each security pack 20 is assigned a unique identification code, and controller 46 causes transceiver 44 to transmit the identification code in addition to the aforementioned location data.

As mentioned above, if a robber takes security pack 20 into a building that has a metal framework, security pack 20 may not be able to properly receive overhead GPS signals; likewise, security pack 20 might not be able to properly transmit cellular phone signals in such an environment. As shown in FIG. 2, security pack 20 also preferably includes a separate conventional radio frequency (RF) transmitter beacon 56, and related RF antenna 58, for allowing authorities to home-in on the security pack within a large building or other structure that prevents cellular transmission of accurate GPS signals from taking place. In this event, the GPS data transmitted by the cellular phone transmitter guides police to such a building or other structure, and final tracking takes place using the conventional RF beacon signal. In such instances, controller 46 deactivates the transceiver 44, and activates beacon transmitter 56.

Ideally, the communications link between security pack 20 and the remote tracking station can be a two-way link, as by transceiver 44. In this case, security pack 20 can actually receive signals transmitted from the remote tracking location over the communications link. In this instance, controller 46 is responsive to signals received by transceiver 44 from the remote location for modifying the operation of security pack 20. For example, in response to signals received from the remote location, controller 46 can deactivate transceiver 44, and activate the radio frequency beacon transmitter 56, as when the police have pinned down the location of security pack 20 to a particular building or area.

Figure 3:
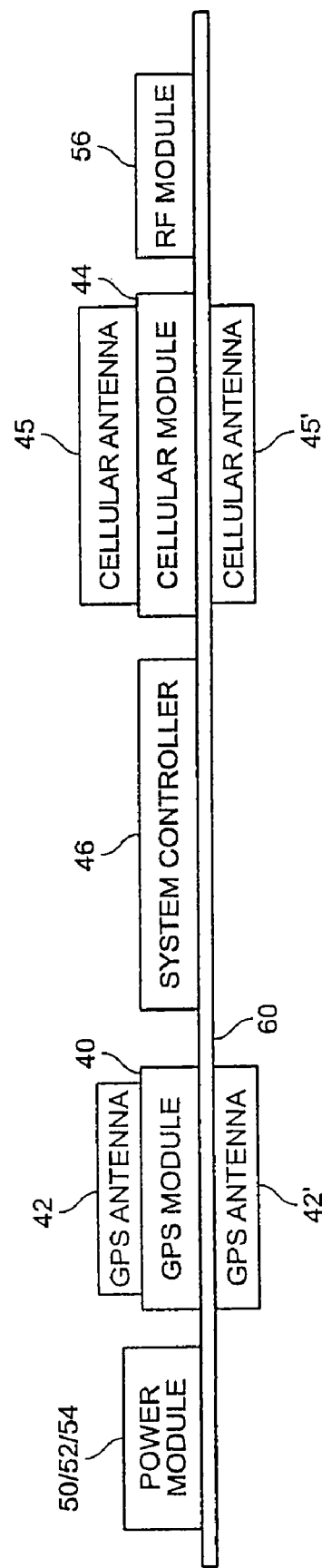
FIG. 3 is a side view of a physical layout of the components of FIG. 2 upon a flexible connecting substrate.
Figure 4:
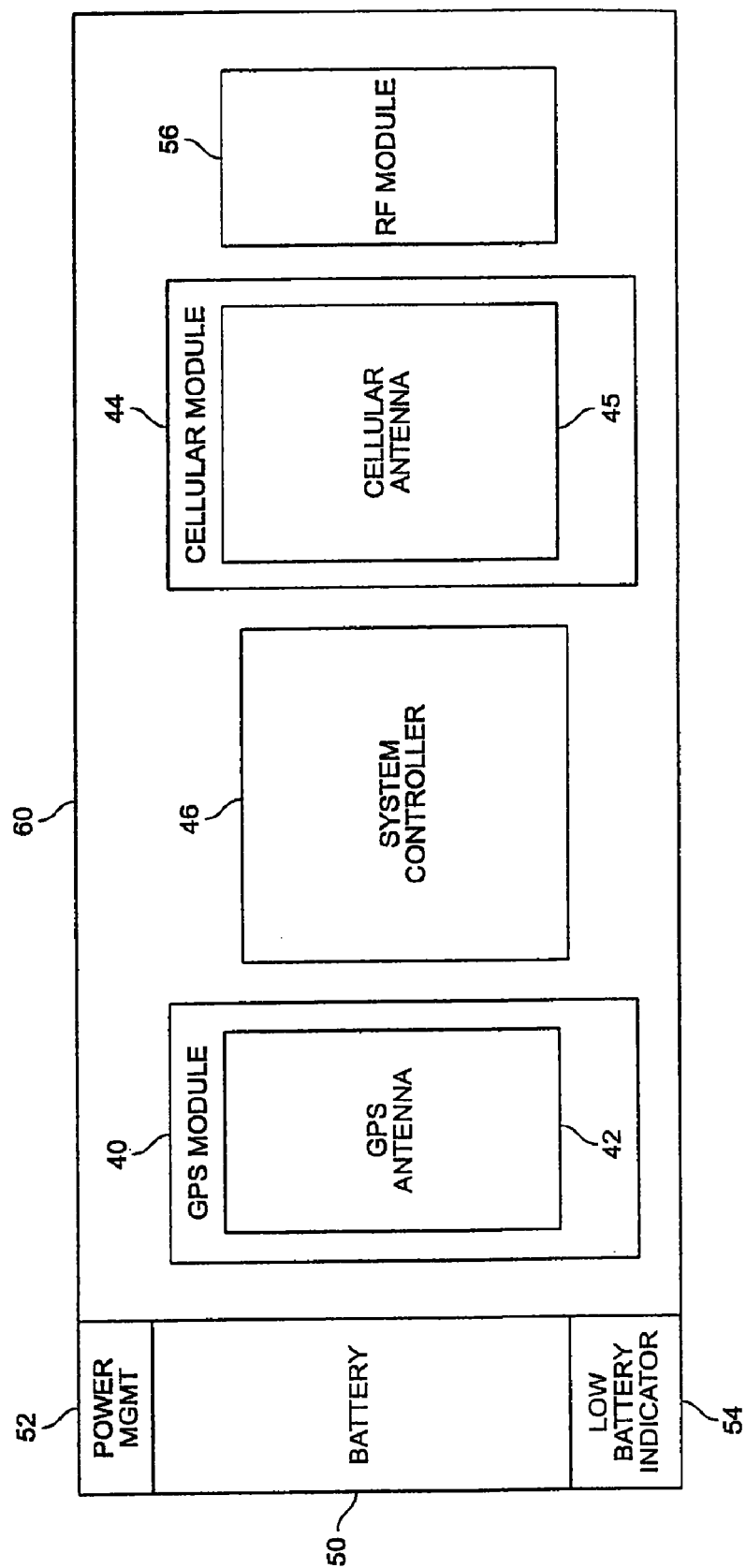
FIG. 4 is a top view of the components shown in FIG. 3.

In FIGS. 3 and 4, the layout of the component chip sets, and related antennas, is shown on a flexible mounting/interconnecting substrate 60. Substrate 60 provides physical support for each of components 40-56, and also incorporates electrical conductors for making electrical interconnections therebetween.

While the description set forth above has described a preferred embodiment using cellular phone transmission, those skilled in the art will appreciate that transmission to overhead satellites may also be employed if desired.

Those skilled in the art will now appreciate that an improved security pack has been described which permits tracking of the location of the security pack at a remote location, with the ability to home-in locally on the security pack. While the present invention has been described with respect to preferred embodiments thereof, such description is for illustrative purposes only, and is not to be construed as limiting the scope of the invention. Various modifications and changes may be made to the described embodiments by those skilled in the art without departing from the true spirit and scope of the invention as defined by the appended claims.

I claim:

1. A tracking system for assisting in theft recovery, the system comprising:
   a tracking unit, the unit comprising:
   a housing simulating a size and weight of a bundled package of currency;
   a global positioning system (GPS) receiver disposed within said housing and configured to receive GPS signals for determining location of the tracking unit;
   a wireless telephone transceiver disposed within said housing and configured to establish a communications link, transmit the location of and an identifier for the tracking unit via the communications link, and to receive a command signal via the communications link;
   a radio frequency (RF) beacon transmitter disposed within said housing configured to transmit an RF beacon; and
   a controller disposed within said housing and electrically coupled to said GPS receiver, said wireless telephone transceiver, and said radio frequency beacon transmitter, said controller configured to direct the wireless telephone transceiver to establish the communications link and transmit the location and identifier, said controller further configured to, in response to the command signal, select an active operating mode of the tracking unit, wherein a first active operating mode comprises the wireless telephone transceiver active and the RF transmitter inactive, and a second active operating mode comprises the wireless telephone transceiver inactive and the RF transmitter active; and
   a remote monitoring unit configured to receive the information transmitted by the tracking unit via the communications link and to transmit the command signal via the communications link when prompted by a system user.

2. The tracking system of claim 1, wherein said tracking unit comprises a power switch for minimizing electrical power drain on a power source for the unit until said tracking unit is activated.

3. The tracking system of claim 2, wherein said power switch comprises a reed switch responsive to a magnetic field of a keeper plate.

4. The tracking system of claim 1, wherein said controller is configured to cause said wireless telephone transceiver to establish the communications link with the remote monitoring unit on a periodic basis after the tracking unit is activated.

5. The tracking system of claim 1, wherein said controller is configured to cause said wireless telephone transceiver to establish and maintain continuously the communications link with the remote monitoring unit after the tracking unit is activated.

6. The tracking system of claim 1, further said tracking unit further comprises a warning generator and a sensor for detecting strength of a power source for said tracking unit, said sensor causing said warning generator to generate a warning if said power source strength falls below a predetermined threshold.

7. The tracking system of claim 1, wherein the remote monitoring unit comprises a modem attached to a computer.

8. The tracking system of claim 1, wherein the remote monitoring unit is configured, upon activation of the tracking system, to show a current location of the tracking unit on a map.

9. The tracking system of claim 8, wherein the remote monitoring unit is configured, upon activation of the tracking system, to show a trail on the map extending from an initial location of the tracking unit on the map to a current location on the map.

10. The tracking system of claim 1, wherein the GPS receiver is attached to a GPS antenna, collectively comprising a GPS module; the wireless telephone transceiver is attached to a wireless telephone antenna, collectively comprising a wireless telephone module; and the GPS module, the wireless telephone module, the radio frequency (RF) beacon transmitter, the controller, and a power source are all disposed on a flexible substrate.

11. The tracking system of claim 10, wherein the flexible substrate further comprises electrical conductors for making electrical connections among the GPS module, the wireless telephone module, the radio frequency (RF) beacon transmitter, the controller, and the power source.

12. A tracking system comprising:
   a tracking unit, the unit comprising:
   a housing that resembles a bundled package of currency;
   a global positioning system (GPS) receiver disposed within said housing for receiving GPS signals for determining location of the tracking unit;
   a first communications module disposed within said housing and configured to operate pursuant to a first communications protocol for establishing a communications link, the first communications module configured to transmit the location of and an identifier for the tracking unit via the communications link and to receive a command signal via the communications link;
   a second communications module disposed within said housing and configured to transmit a beacon signal via a second communications protocol different from the first communications protocol; and
   a controller disposed within said housing and electrically coupled to said GPS receiver, said first communications module, and said second communications module, said controller configured to cause the first communications module to establish the communications link and transmit the location and identifier, and further configured to select an active operating mode of the tracking unit in response to receipt of the command signal, wherein a first active operating mode comprises the first communications module active and the second communications module inactive, and a second active operating mode comprises the first communications module inactive and the second communications module active; and
   a remote monitoring unit configured to receive the information transmitted by the tracking unit via the communications link and to transmit the command signal via the communications link when prompted by a system user.

13. The tracking system of claim 12, wherein the first communications module comprises a transceiver.

14. The tracking system of claim 12, wherein the first communications protocol comprises a wireless telephone communications protocol.

15. The tracking system of claim 14, wherein the wireless telephone communications protocol is a cellular telephone protocol.

16. The tracking system of claim 12, wherein the second communications protocol comprises an RF frequency communications protocol.

17. The tracking system of claim 12, wherein the first communications protocol comprises a wireless telephone communications protocol and the second communications protocol comprises an RF frequency communications protocol.

18. The tracking system of claim 12, wherein the GPS receiver, the first communications module, the second communications module, the controller, and a power source are all disposed on a flexible substrate.

19. The tracking system of claim 12, wherein the remote monitoring unit is configured, upon activation of the tracking system, to show a current location of the tracking unit on a map.

* * * * *